US007783661B2

(12) United States Patent
Day et al.

(10) Patent No.: US 7,783,661 B2
(45) Date of Patent: Aug. 24, 2010

(54) METHOD AND APPARATUS FOR OPTIMIZING QUERIES IN A LOGICALLY PARTITIONED COMPUTER SYSTEM

(75) Inventors: Paul Reuben Day, Rochester, MN (US); Robert Douglas Driesch, Jr., Lakeville, MN (US); Randy Lynn Egan, Rochester, MN (US); Jeffrey Wayne Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/931,900

(22) Filed: Oct. 31, 2007

(65) Prior Publication Data
US 2008/0059438 A1 Mar. 6, 2008

Related U.S. Application Data

(63) Continuation of application No. 11/117,617, filed on Apr. 28, 2005, now Pat. No. 7,346,612, which is a continuation of application No. 10/001,667, filed on Oct. 25, 2001, now Pat. No. 6,931,395.

(51) Int. Cl.
*G06F 17/30* (2006.01)
(52) U.S. Cl. .................................... 707/769; 707/802
(58) Field of Classification Search ............. 707/609, 707/705, 769, 802
See application file for complete search history.

(56) References Cited

U.S. PATENT DOCUMENTS

| 5,031,089 | A |   | 7/1991  | Liu et al. |
|-----------|---|---|---------|------------|
| 6,014,656 | A |   | 1/2000  | Hallmark et al. |
| 6,115,705 | A | * | 9/2000  | Larson ........................ 707/3 |
| 6,195,661 | B1|   | 2/2001  | Filepp et al. |
| 6,247,109 | B1|   | 6/2001  | Kleinsorge et al. |
| 6,804,662 | B1|   | 10/2004 | Annau et al. |

OTHER PUBLICATIONS

Rina Dechter et al., "Generalized best-first Search strategies and optimality of A*", Journal of the Association for Computing Machinery, vol. 32, No. 3, Jul. 1985, pp. 505-536.

* cited by examiner

*Primary Examiner*—Fred I Ehichioya
(74) *Attorney, Agent, or Firm*—Roy W. Truelson

(57) ABSTRACT

A database query optimizer for a computer system having dynamically configurable logical partitions generates an optimized query strategy which is dependent on a logical partition configuration. When the query is executed, the configuration of the logical partition in which the query is executed is compared to the logical partition configuration for which the query was optimized. If the configurations are different, a new query can be automatically generated. Optimizing database queries to the current system configuration of a dynamic, logically partitioned system potentially offers greater efficiency in the execution of database queries for complex, logically partitioned systems.

14 Claims, 6 Drawing Sheets

METHOD AND APPARATUS FOR OPTIMIZING QUERIES IN A LOGICALLY PARTITIONED COMPUTER SYSTEM

CROSS REFERENCE TO RELATED APPLICATIONS

This is a continuation of pending U.S. patent application Ser. No. 11/117,617, filed Apr. 28, 2005, entitled "Method and Apparatus for Optimizing Queries in a Logically Partitioned Computer System", which is a continuation of U.S. patent application Ser. No. 10/001,667, filed Oct. 25, 2001, entitled "Method and Apparatus for Optimizing Queries in a Logically Partitioned Computer System", now issued as U.S. Pat. No. 6,931,395, both of which are herein incorporated by reference.

FIELD OF THE INVENTION

The present invention relates generally to digital data processing, and more particularly to the generation of database queries in a digital computer system.

BACKGROUND OF THE INVENTION

A modern computer system typically comprises a central processing unit (CPU) and supporting hardware necessary to store, retrieve and transfer information, such as communications busses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Many improvements have been made and continue to be made to increase the speed of individual computer processors. However, there are certain limits to processor clock speed, number of circuits on a chip, and so forth which limit the overall throughput of a single processor. To support increasing demand for computing resource, it has become common in many large systems to employ multiple processors as a means of further increasing the throughput of the system. Additionally, such large systems may have multiple caches, buses, I/O drivers, storage devices and so forth.

The proliferation of system components introduces various architectural issues involved in managing these resources. For example, multiple processors typically share the same main memory (although each processor may have its own cache). If two processors have the capability to concurrently read and update the same data, there must be mechanisms to assure that each processor has authority to access the data, and that the resulting data is not gibberish. Another architectural issue is the allocation of processing resources to different tasks in an efficient and "fair" manner, i.e., one which allows all tasks to obtain reasonable access to system resources. There are further architectural issues, which need not be enumerated in great detail here.

One recent development in response to this increased system complexity is to support logical partitioning of the various resources of a large computer system. Conceptually, logical partitioning means that multiple discrete partitions are established, and the system resources of certain types are assigned to respective partitions. Specifically, processor resources of a multi-processor system may be partitioned by assigning different processors to different partitions, by sharing processors among some partitions and not others, by specifying the amount of processing resource measure available to each partition which is sharing a set of processors, and so forth. Each task executes within a logical partition, meaning that it can use only the resources assigned to that partition, and not resources assigned to other partitions.

Logical partitions are generally defined and allocated by a system administrator or user with similar authority. I.e., the allocation is performed by issuing commands to appropriate management software resident on the system, rather than by physical reconfiguration of hardware components. It is expected, and indeed one of the benefits of logical partitioning is, that the authorized user can re-allocate system resources in response to changing needs or improved understanding of system performance. Some logical partitioning systems support dynamic partitioning, i.e., the changing of certain resource definition parameters while the system is operational, without the need to shut down the system and re-initialize it.

Complex systems may be used to support a variety of applications, but one common use is the maintenance of large databases, from which information may be obtained. Large databases usually support some form of database query for obtaining information which is extracted from selected database fields and records. Such queries can consume significant system resources, particularly processor resources.

A query involves retrieving and examining records in a database according to some search strategy. Not all strategies are equal. Various factors may affect the choice of optimum search strategy. To support database queries, some large database applications have query optimizers which construct search strategies. An optimizer is an application program which is intended to construct a near optimal search strategy for a given set of search parameters, according to known characteristics of the database, the system on which the search strategy will be executed, and/or and optional user specified optimization goals. Often, a query (search strategy) constructed by a query optimizer can be saved and re-used again and again.

In constructing a search strategy, some query optimizers consider the configuration of a computer system. I.e., depending on the system resources, it may be possible to execute different parts of the query simultaneously on different processors. For example, one processor may find all records wherein a field X matches parameter $x_0$, while another processor concurrently finds all records wherein a field Y matches parameter $y_0$. The two lists of records found by the two processors may subsequently be combined by intersection, union or other more complex operations. In this case, it is likely that the availability of two processors will reduce the total time required to perform the query.

Where a system is logically partitioned, the query executes in one of the logical partitions. In the case of dynamically defined logical partitions, it is possible that the parameters of the logical partition in which the query executes will change. A query which is optimized by a query optimizer and executed after a substantial time lag (e.g., is designed to be re-used periodically) might therefore have been generated under system configuration assumptions which are no longer true. A need therefore exists, not necessarily recognized, to assure that query strategies accurately reflect the current system configuration under which they are to be executed.

SUMMARY OF THE INVENTION

A query optimizer for database queries in a computer system having dynamically configurable logical partitions generates an optimized query strategy which is dependent on a logical partition configuration. When the query is executed, the configuration of the logical partition in which the query is executed is compared to the logical partition configuration for which the query was optimized. If the configurations are different, a new query can be automatically generated.

In the preferred embodiment, the system is configured as a plurality of logical partitions, each partition having an assigned set of physical processors (which may be shared with one or more other partitions), an assigned processor resource measure (i.e., a processor resource measure in units of equivalent physical processors) and an assigned number of virtual processors. In a rough sense, each partition behaves as if it contains as many processors as the assigned number of virtual processors, each such processor having an appropriate fraction of the processing capacity of a physical processor. The set of physical processors, the processor resource measure, and the number of virtual processors assigned to a logical partition may be dynamically altered during system operation.

Preferably, a database query optimizer considers the logical configuration of the logical partition to which it is assigned when optimizing database queries. In particular, the number of virtual processors is used to optimize the query. Since the logical configuration is subject to dynamic changes, the query optimizer determines current configuration when optimizing the query.

Preferably, the query optimizer may save a query as a persistent object for later use. The system configuration assumptions used for optimizing the query are saved in the query object, in particular, the number of virtual processors of the partition. This information is compared to current system data when the query is later called for execution.

Preferably, the user may optionally disable re-optimization of a query notwithstanding a change in the configuration of logical partitions.

Optimizing database queries to the current system configuration of a dynamic, logically partitioned system potentially offers greater efficiency in the execution of database queries for complex, logically partitioned systems.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Logical Partitioning Overview

Figure 1:
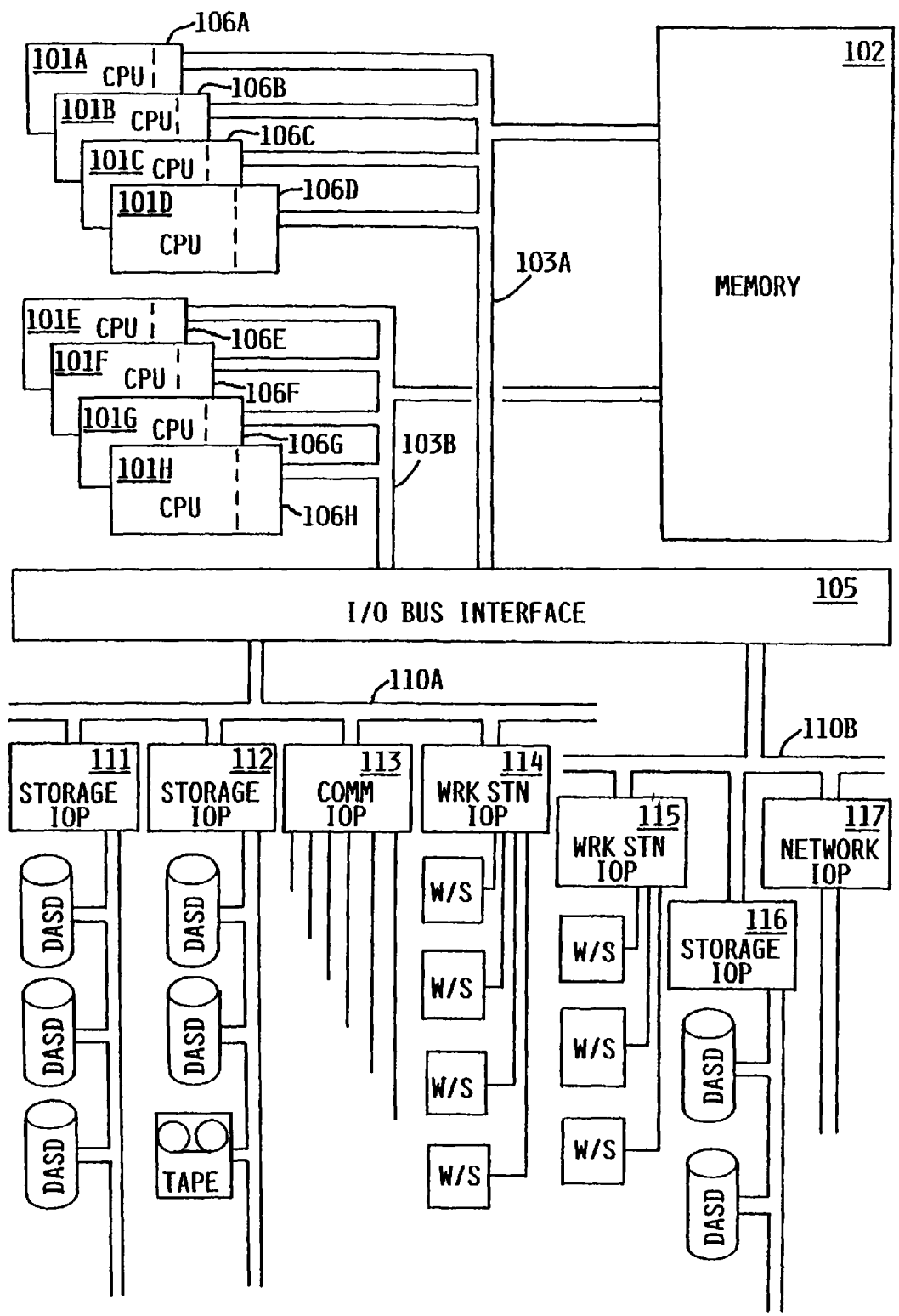
FIG. 1 is a high-level block diagram of the major hardware components of a logically partitioned computer system having multiple CPUs, according to the preferred embodiment of the invention described herein.

Logical partitioning is a technique for dividing a single large computer system into multiple partitions, each of which behaves in some respects as a separate computer system. Certain resources of the system may be allocated into discrete sets, such that there is no sharing of a single resource among different partitions, while other resources may be shared on a time interleaved or other basis. Examples of resources which may be partitioned are central processors, main memory, I/O processors and adapters, and I/O devices. Each user task executing in a logically partitioned computer system is assigned to one of the logical partitions ("executes in the partition"), meaning that it can use only the system resources assigned to that partition, and not resources assigned to other partitions.

Logical partitioning is indeed logical rather than physical. A general purpose computer typically has physical data connections such as buses running between a resource in one partition and one in a different partition, and from a physical configuration standpoint, there is typically no distinction made with regard to logical partitions. Generally, logical partitioning is enforced by low-level encoded data, which is referred to as "licensed internal code", although there may be a certain amount of hardware support for logical partitioning, such as hardware registers which hold state information. E.g., from a hardware standpoint, there is nothing which prevents a task executing in partition A from writing to an I/O device in partition B. Low level licensed internal code function and/or hardware prevent access to the resources in other partitions.

Code enforcement of logical partitioning constraints means that it is possible to alter the logical configuration of a logically partitioned computer system, i.e., to change the number of logical partitions or re-assign resources to different partitions, without reconfiguring hardware. Generally, a logical partition management tool is provided for this purpose. This management tool is intended for use by a single or a small group of authorized users, who are herein designated the system administrator. In the preferred embodiment described herein, this management tool is referred to as the "hypervisor". A portion of this management tool used for creating or altering a configuration executes in one of the logical partitions, herein designated the "primary partition".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. Finally, it makes it possible for a single computer system to concurrently support multiple operating systems, since each logical partition can be executing in a different operating system.

Additional background information regarding logical partitioning can be found in the following commonly owned patents and patent applications, which are herein incorporated by reference: Ser. No. 09/838,057, filed Apr. 19, 2001, entitled Method and Apparatus for Allocating Processor Resources in a Logically Partitioned Computer System; U.S. Pat. No. 6,766,398 to Holm, et al.; U.S. Pat. No. 6,820,164 to Holm et al.; U.S. Pat. No. 6,662,242 to Holm et al.; Ser. No. 09/672,043, filed Sep. 29, 2000, entitled Technique for Configuring Processors in System With Logical Partitions; U.S. Pat. No. 6,438,371 to Doing et al; U.S. Pat. No. 6,467,007 to Armstrong et al.; U.S. Pat. No. 6,681,240 to Armstrong et al.; Ser. No. 09/314,324, filed May 19, 1999, entitled Management of a Concurrent Use License in a Logically Partitioned Computer; U.S. Pat. No. 6,691,146 to Armstrong et al.; U.S. Pat. No. 6,279,046 to Armstrong et al.; U.S. Pat. No. 5,659,786 to George et al.; and U.S. Pat. No. 4,843,541 to Bean et al. The latter two patents describe implementations using the IBM S/360, S/370, S/390 and related architectures, while the remaining patents and applications describe implementations using the IBM AS/400 and related architectures.

DETAILED DESCRIPTION

The major hardware components of a multiprocessor computer system 100 for utilizing a query optimizing technique according to the preferred embodiment of the present invention are shown in FIG. 1. Multiple central processing units (CPUs) 101A-101H concurrently perform basic machine processing function on instructions and data from main memory 102. Each processor preferably contains or controls a respective cache. These cache structures are shown conceptually in FIG. 1 as a single block 106A-106H for each respective processor; however, it should be understood that a processor's cache may include multiple separate structures at multiple levels, such as an on-chip L1 instruction cache, an on-chip L1 data cache, an on-chip L2 cache directory/controller, and an L2 cache memory on a separate chip. For purposes of this invention, the precise implementation details of caching in each processor are not significant, and the caches could be implemented differently, or the invention could be implemented without caches associated with the processors.

A pair of memory buses 103A, 103B connect the various CPUs, main memory, and I/O bus interface unit 105. I/O bus interface unit 105 communicates with multiple I/O processing units (IOPs) 111-117 through respective system I/O buses 110A, 110B. In the preferred embodiment, each system I/O bus is an industry standard PCI bus. The IOPs support communication with a variety of storage and I/O devices, such as direct access storage devices (DASD), tape drives, workstations, printers, and remote communications lines for communication with remote devices or other computer systems. While eight CPUs, two memory buses, two I/O buses, and various numbers of IOPs and other devices are shown in FIG. 1, it should be understood that FIG. 1 is intended only as an illustration of the possible types of devices that may be supported, and the actual number and configuration of CPUs, buses, and various other units may vary. It should also be understood that the buses are illustrated in a simplified form as providing communications paths between various devices, and in fact the actual bus structure may be more complex, and contain additional hierarchies or components not shown. For simplicity, CPUs, memory buses and I/O buses are herein designated generically by reference numbers 101, 103 and 110, respectively.

While various system components have been described and shown at a high level, it should be understood that a typical computer system contains many other components not shown, which are not essential to an understanding of the present invention. In the preferred embodiment, computer system 100 is a multiprocessor computer system based on the IBM AS/400 or I/Series architecture, it being understood that the present invention could be implemented on other multiprocessor computer systems.

Figure 2:
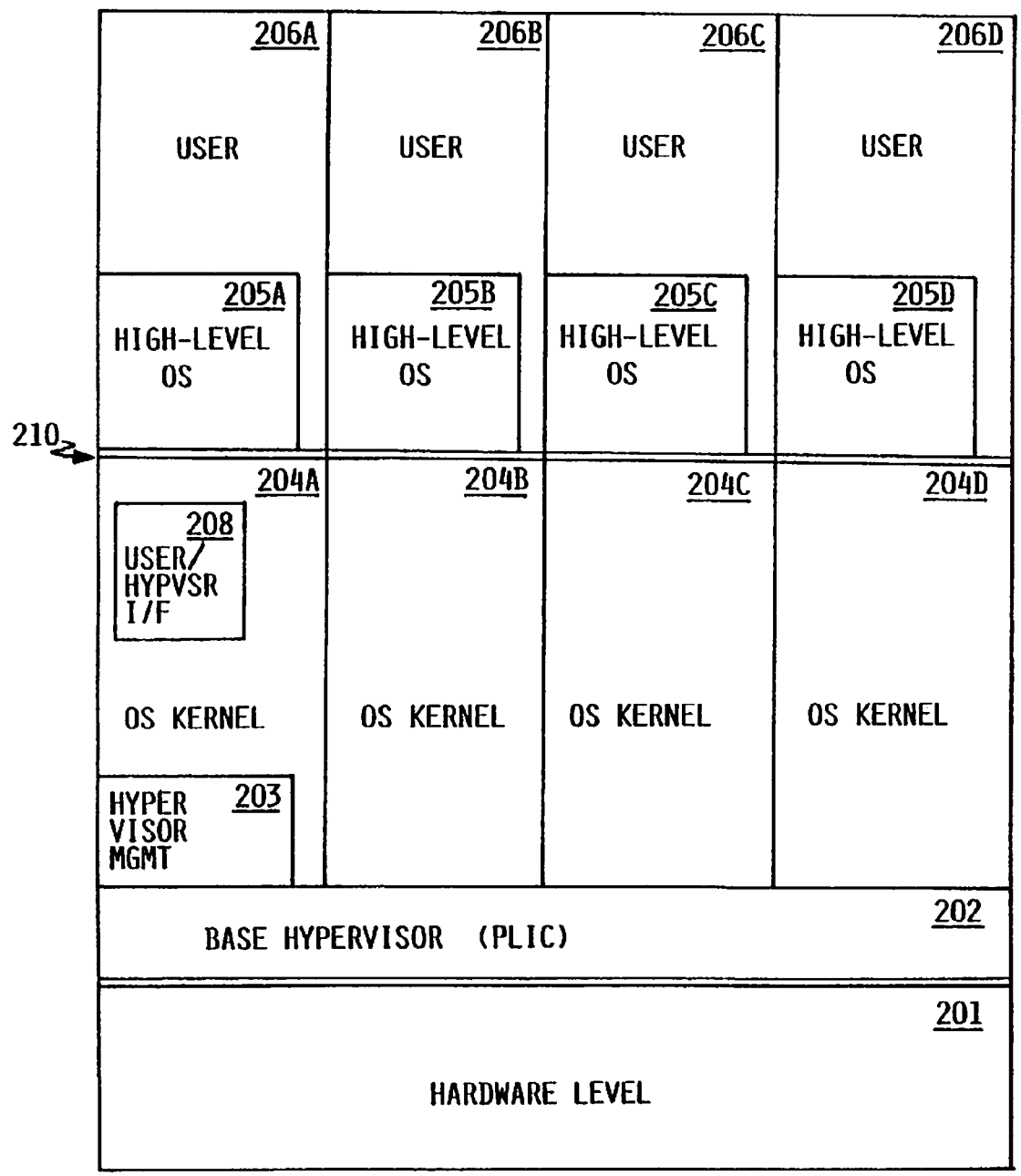
FIG. 2 is a conceptual illustration showing the existence of logical partitions at different hardware and software levels of abstraction in a computer system, according to the preferred embodiment.

FIG. 2 is a conceptual illustration showing the existence of logical partitions at different hardware and software levels of abstraction in computer system 100. FIG. 2 represents a system having four logical partitions, it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 2, the "higher" levels of abstraction are represented toward the top of the figure, while lower levels are represented toward the bottom.

As shown in FIG. 2 and explained earlier, logical partitioning is a code-enforced concept. At the hardware level 201, logical partitioning does not exist. As used herein, hardware level 201 represents the collection of physical devices (as opposed to data stored in devices), such as processors, memory, buses, I/O devices, etc., shown in FIG. 1, including other hardware not shown in FIG. 1. As far as a processor 101 is concerned, it is merely executing machine language instructions. In the preferred embodiment, each processor is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 2 as a single entity 201, which does not distinguish between logical partitions.

Immediately above the hardware is a common low-level hypervisor base 202, also called partitioning licensed internal code (PLIC), which enforces logical partitioning. As represented in FIG. 2, there is no direct path between higher levels (levels above hypervisor 202) and hardware level 201, meaning that commands or instructions generated at higher levels must pass through hypervisor 202 before execution on the hardware. Hypervisor 202 enforces logical partitioning of processor resources by presenting a partitioned view of hardware to the task dispatchers at higher levels. I.e., task dispatchers at a higher level (the OS kernel) dispatch tasks to virtual processors defined by the logical partitioning parameters, and the hypervisor in turn dispatches virtual processors to physical processors at the hardware level 201 for execution of the underlying task. The hypervisor also enforces partitioning of other resources, such as allocations of memory to partitions, and routing I/O to I/O devices associated with the proper partition. Hypervisor 202 contains state data, some of which may be stored in special purpose registers while other such state data is stored in tables or other structures. Essentially, this state data defines the allocation of resources in logical partitions, and the allocation is altered by changing the state data rather than by physical reconfiguration of hardware.

Above hypervisor 202 is another level of machine management code herein identified as the "OS kernel" 204A-204D. At the level of the OS kernel, each partition behaves differently, and therefore FIG. 2 represents the OS Kernel as four different entities 204A-204D corresponding to the four different partitions. In general, each OS kernel 204A-204D performs roughly equivalent functions, and the OS kernel is herein generically referred to as feature 204. However, it is not necessarily true that all OS kernel 204A-204D are identical copies of licensed internal code, and they could be different versions of architecturally equivalent licensed internal code, or could even be architecturally different licensed internal code modules. OS kernel 204 performs a variety of task management functions, and in particular, enforces data integrity and security among multiple tasks.

Above the OS kernel are a set of high-level operating system functions 205A-205D, and user application code and data 206A-206D. A user may create code in levels 206A-206D which invokes one of high level operating system functions 205A-205D to access the OS kernel, or may directly access the OS kernel. This is represented in FIG. 2 by showing that both high level operating system functions 205A-205D and user application levels 206A-206D reach the OS kernel boundary. In the AS/400 architecture, a user-accessible architecturally fixed "machine interface" 210 forms the upper boundary of the OS kernel, (the OS kernel being referred to as "SLIC"), but it should be understood that different operating system architectures may define this interface differently, and that it would be possible to operate different operating systems on a common hardware platform using logical partitioning.

One and only one of the logical partitions is designated the primary partition, which is the partition used by the system administrator to manage logical partitioning. The primary partition contains a special portion of hypervisor code 203 which shares the level of OS kernel 204A. Hypervisor portion 203 contains code necessary to create or alter logical partition definitions. Collectively, hypervisor portion 203 and hypervisor base 202 constitute the hypervisor. Additionally, a user-to-hypervisor interface 208 is provided at the OS kernel level in the primary partition. Interface 208 provides functions for interacting with a user (system administrator) to obtain user-specified partitioning parameters. The functions available in interface 208 may be used directly in a direct-attach terminal, or may be accessed through a set of APIs from other interface code (not shown) in any device (such as an intelligent workstation) connected to computer system 100. The hypervisor is super-privileged code which is capable of accessing resources, and specifically processor resources, in any partition. The hypervisor causes state values to be written to various hardware registers and other structures, which define the boundaries and behavior of the logical partitions.

In accordance with the preferred embodiment, the administrator defines multiple logical partitions and the resources available to each. With respect to processing resource, the administrator specifies four things: the number of virtual processors available to each partition, the processing capacity available to the partition, whether the assigned processing capacity is capped, and the assignment of physical processors to partitions. The processor parameters are explained with reference to the examples below. Any or all of these parameters may be dynamically changed by the administrator, effecting an altered configuration. By "dynamically changed" it is meant that the administrator may alter certain parameters which define a logical partition while the computer system is operating, without the need to shut down the system and re-initialize it. It is not necessarily the case that all parameters which define logical partitions may be altered dynamically, but in the preferred embodiment, the processor parameters described herein can be dynamically altered. One consequence of the capability to dynamically change the logical partition defining parameters is that a job or process may commence execution in a logical partition P having defined parameters $p_1, p_2, p_3 \ldots$, and while the job or process is executing these parameters may change to $p_1', p_2', p_3' \ldots$, so that the job or process continues executing in partition P, having different characteristics.

Figure 3:
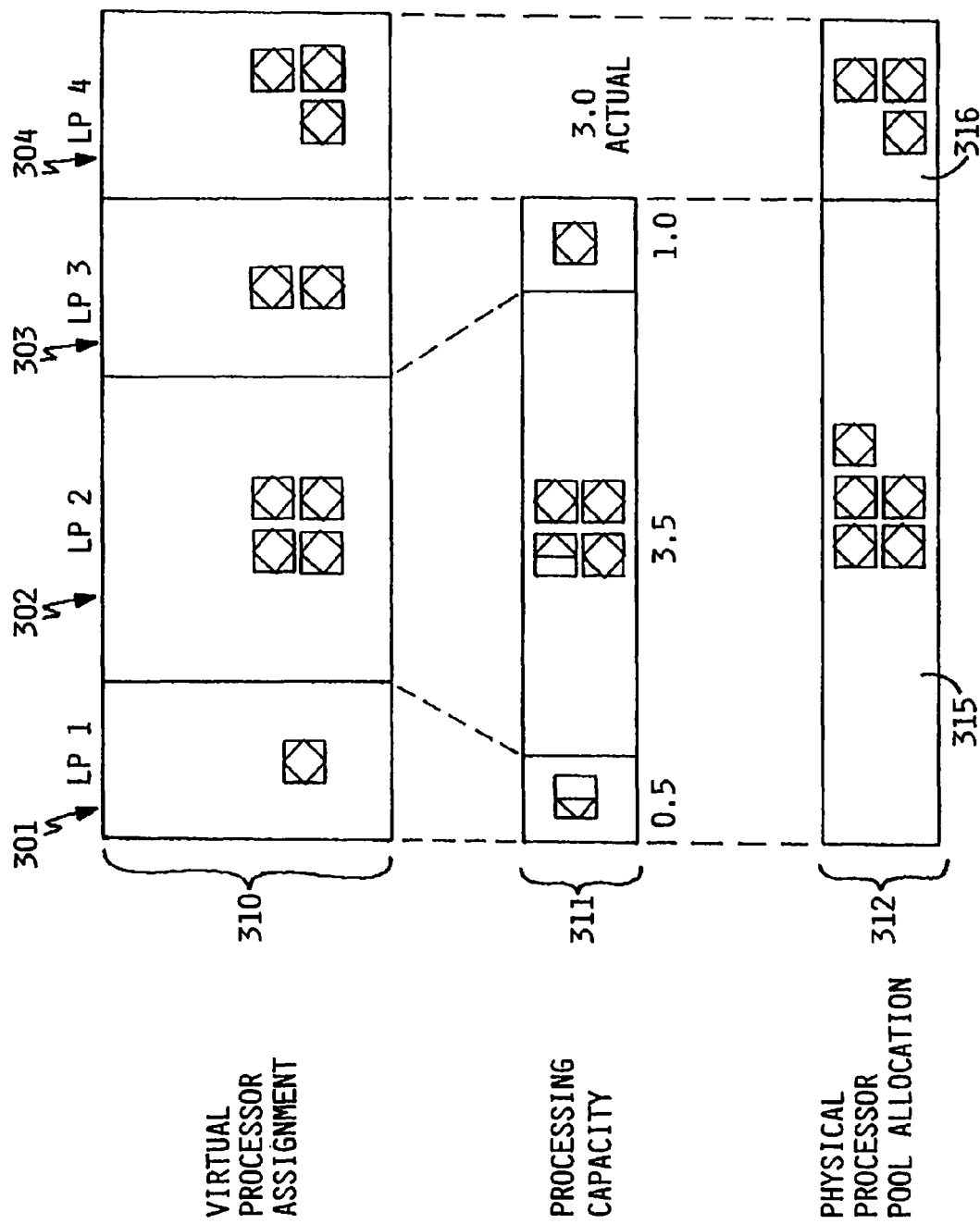
FIG. 3 shows an example logical partitioning processor allocation for a system having eight physical processors, according to the preferred embodiment.

FIG. 3 shows an example logical partitioning processor allocation for a system having eight physical processors. As shown in FIG. 3, four logical partitions 301-304 are defined. For each logical partition, there exists a respective virtual processor assignment 310, and a processing capacity allocation 311. Additionally, there exists an allocation 312 for physical processors. In the example of FIG. 3, logical partition 301 is assigned one virtual processor and 0.5 processing unit of processing capacity; logical partition 302 is assigned four virtual processors and 3.5 processing units of processing capacity; and partition 303 is assigned two virtual processors and 1.0 unit of processing capacity. Partition 304 is assigned three dedicated processors (an actual processing capacity of 3.0 units). Virtual processors are always assigned in integer numbers. Processing capacity is not necessarily an integer.

In the example of FIG. 3, two sets of processors 315, 316 are defined. Set 315, which is a "pool", contains five physical processors, while set 316 contains three. Logical partitions 301-303 execute in pool 315, while partition 304 executes in set 316.

A physical processor allocation constrains a task executing in an associated partition to run on only the processors allocated to the processor set to which the partition is assigned. In this embodiment, a set of one or more processors may be assigned to a partition in dedicated mode, or may be assigned to a processor pool, to which one or more partitions are in turn assigned. Dedicated mode means simply that the full capacity of the set of physical processors is dedicated to a single partition. In a pooled mode, the processors are assigned to a pool, which is typically (although not necessarily) shared among more than one partition. Dedicated mode is functionally equivalent to a pool to which only one logical partition is assigned, and in which the full capacity and number of virtual processors of the pool are given to the one partition.

Thus, in the example of FIG. 3, set 315 is shared among multiple partitions and is a processor pool, while set 316 is a set of processors dedicated to partition 304. A task executing in partition 301 can be dispatched to any of the five physical processors allocated to pool 315, but can not be dispatched to any of the three physical processors allocated to set 316, even if those processors are idle. Since pool 315 is shared among partitions 301-303, the tasks executing in these partitions share the five processors assigned to pool 315.

The processing capacity allocation specifies the amount of equivalent processing power allocated to a partition in processor units. I.e., one processor unit is the equivalent of a single physical processor executing 100% of the time. The sum of the processing capacity allocations of all partitions assigned to a particular processor pool can not exceed the number of physical processors in the pool, although it may be less than the number of physical processors in the pool (in which case, there is unallocated processor capacity).

In the example of FIG. 3, logical partition 301 is allocated 0.5 units of processing capacity, which means it is allocated a capacity equivalent to one physical processor executing 50% of the time (or running at 50% of normal speed). However, this does not mean that one of the processors in pool 315 will execute roughly half time on behalf of tasks in partition 301. Work from any one partition assigned to a pool is distributed among the processors in the pool, and it can be expected that on the average each of the five processors in pool 315 will devote about 10% of its capacity to executing on behalf of tasks from partition 301. The user specifies a processing capacity allocation only for partitions assigned to pools; partitions having dedicated processors automatically receive the full capacity of the dedicated processors. FIG. 3 therefore shows a processing capacity of 3.0 for partition 304, this being an equivalent number, although in fact the user does not specify a processing capacity.

The virtual processor assignment specifies the number of virtual processors seen by each respective partition which is assigned to a pool of processors. To the partition, the underlying hardware and dispatching code behaves like the number of virtual processors specified, each of which is running at some fraction of the power of a single physical processor, the fraction being the number of virtual processors divided by the number processing units allocated to the partition. Thus, in the example of FIG. 3, partition 302 sees four virtual processors, each operating at approximately 82.5% (3.5/4) of the capacity of a single physical processor. Partition 303 sees two virtual processors, each operating at 50% of the capacity of a single physical processor. Like processing capacity, the user specifies a virtual processor allocation only for partitions assigned to pools; partitions having dedicated processors automatically receive a number of virtual processors equal to physical processors. FIG. 3 therefore shows three virtual processors for partition 304.

A logical partition assigned to a pool may be designated either capped or uncapped. A capped partition can not use more processing capacity than its allocation, even if processors are idle due to lack of available work from other partitions in the same pool. Capping assures that a particular logical partition will not exceed its allocated usage, which is desirable in some circumstances. An uncapped partition may utilize spare processing capability beyond its allocation, provided that it may not execute its tasks on physical processors outside its assigned processor pool. Capping does not apply to partitions having dedicated processors.

The configuration of FIG. 3 is merely a single example configuration, and many variations are possible. The number of processor sets may vary. Since sets of processors are disjoint and each set must have at least one physical processor, the number of such sets is necessarily limited by the number of physical processors in the system. But in other respects, the administrator is free to allocate sets as he wishes, and may allocate zero, one or multiple sets which are pools, and zero, one or multiple sets which are dedicated to a single respective logical partition. Additionally, while a processor pool is usually used for sharing among multiple partitions, a processor pool could have only a single partition assigned to it. For example, if for some reason it is desired to limit the processor resources allocated to a single logical partition, a pool containing a single processor could be defined, to which a single logical partition is assigned, the partition being given a processing capacity of 0.5 processors and specified as capped. It should further be understood that the set of processor parameters described above which are associated with logical partitions are simply one implementation of the general concept of logical partitioning, and that different parameters could be used to define the characteristics of each logical partition.

Figure 4:
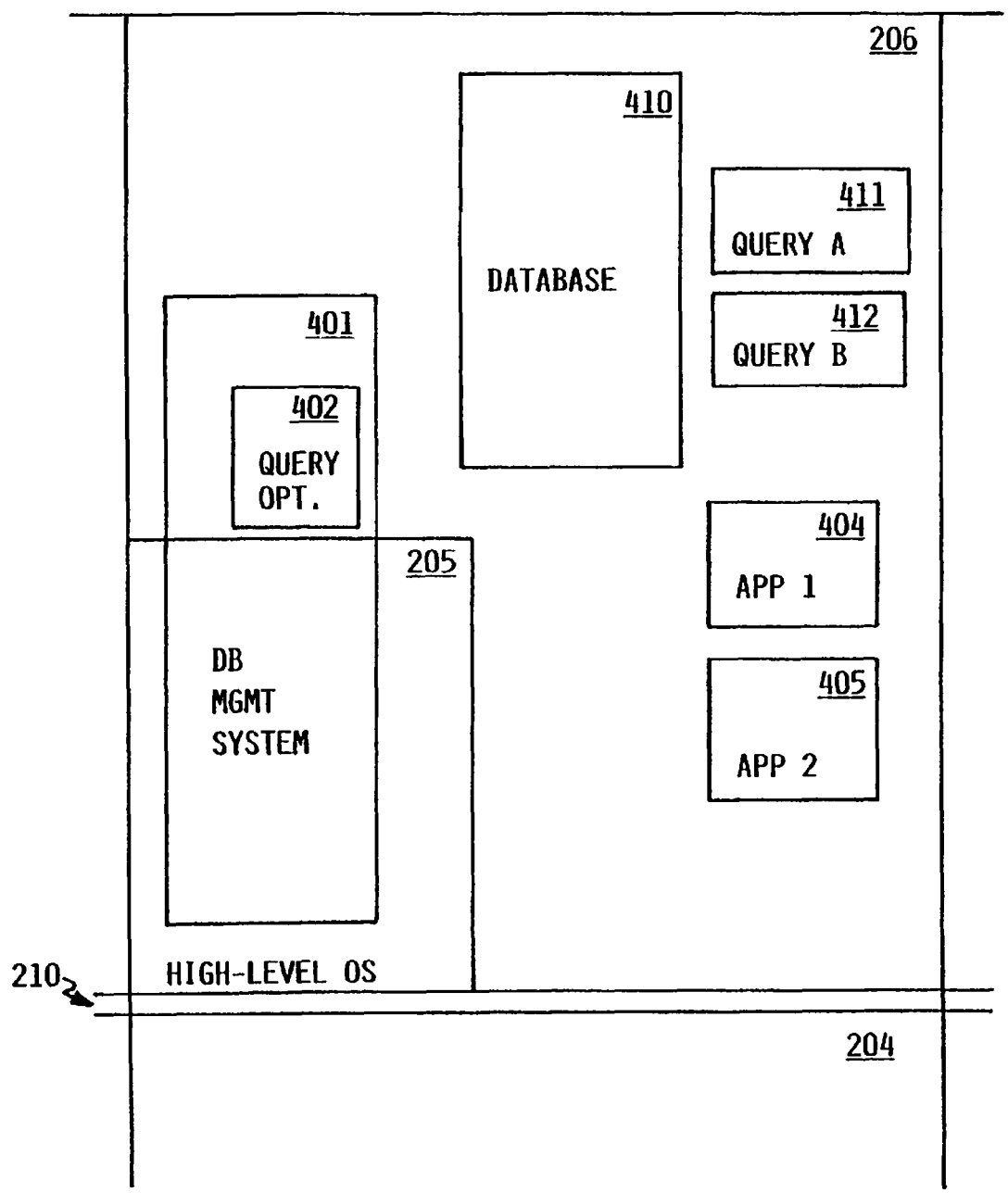
FIG. 4 illustrates at a high level various user applications and data in a logical partition of a computer system, according to the preferred embodiment.

Each user job or process is assigned to a respective logical partition. Typically, a single logical partition will contain many user applications (although some partitions may be dedicated to special purposes). FIG. 4 illustrates at a high level various user applications and data in a logical partition of computer system 100.

As shown in FIG. 4, at a level above machine interface 210 in a logical partition P, there exists high level operating system functions 205 and user applications and data 206. Database management system 401 provides basic functions for the management of user databases. Database management system 401 may theoretically support an arbitrary number of databases, but only a single database 410 is illustrated in FIG. 4. In addition to database management system 401, other user applications 404-405 may execute in partition P. Such other user applications may include, e.g., word processing, accounting, code development and compilation, mail, calendaring, or any of thousands of user applications. Some of these applications may access data in database 410, while others may not.

Database 410 is illustrated in FIG. 4 as a conceptual entity because various applications at this level may access it. However, it will be understood that the database itself is not executable code and does not itself perform a function. Database 410 may be extremely large, and could include data on other systems which is accessed through remote procedure calls or the like.

Database management system 401 preferably supports a variety of database related functions. Specifically, it allows users to perform basic database operations, such as defining a database, altering the definition of the database, creating, editing and removing records in the database, viewing records in the database, and so forth. It may further contain any of various more advanced database functions. Database management system 401 may be contained entirely within high-level operating system 205, or may be separate from high-level OS 205, or portions of it may be within high-level OS 205 while other portions are separate.

Among the functions supported by database management system 401 is the making of queries against data in database 410. As is known, queries typically take the form of statements having a defined format, which test records in the database to find matches to some set of logical conditions. Typically, multiple conditions are connected by logical conjunctives such as "AND" and "OR". Because database 410 may be very large, having a very large number of records, and a query may be quite complex, involving multiple logical conditions, it can take some time for a query to be executed against the database, i.e., for all the necessary records to be reviewed and to determine which records, if any, match the conditions of the query.

The amount of time required to perform a complex query on a large database can vary greatly, depending on many factors. Depending on how the data is organized and indexed, and the conditions of the query, it may be desirable to evaluate records in a particular order, to evaluate certain logical conditions before evaluating other logical conditions, to evaluate certain logical conditions in parallel, and/or to evaluate conditions against subsets of the database in parallel.

In order to provide improved database query support, database management system 401 contains query optimizer portion 402. Optimizer 402 generates search strategies for performing database queries. A search strategy is a defined series of steps for performing the query, and thus is, in effect, a computer program. The optimizer 402 which generates the search strategy is something akin to a compiler, although the strategy is not necessarily executable level code, and is more typically a higher-level series of statements which invoke low-level operating system functions. Once created by optimizer 402, a strategy is saved as a persistent storage object in memory and can be written to disk or other storage. It therefore can be executed many times. Persistent storage objects labeled "Query A" 411 and "Query B" 412 in FIG. 4 represent query strategies generated by optimizer 402. These objects are "persistent" in the sense that they exist independently of the user process under which they were created, and may continue to reside in memory or disk storage notwithstanding that the user process has terminated. Although these are referred to herein as "query strategy objects", the use of the term "object" is not meant to imply that database management system 401 or the user application are necessarily programmed using so-called object-oriented programming techniques, or that the "query strategy object" necessarily has the attributes of an object in an object-oriented programming environment, although it would be possible to implement them using object-oriented programming constructs.

Figure 5:
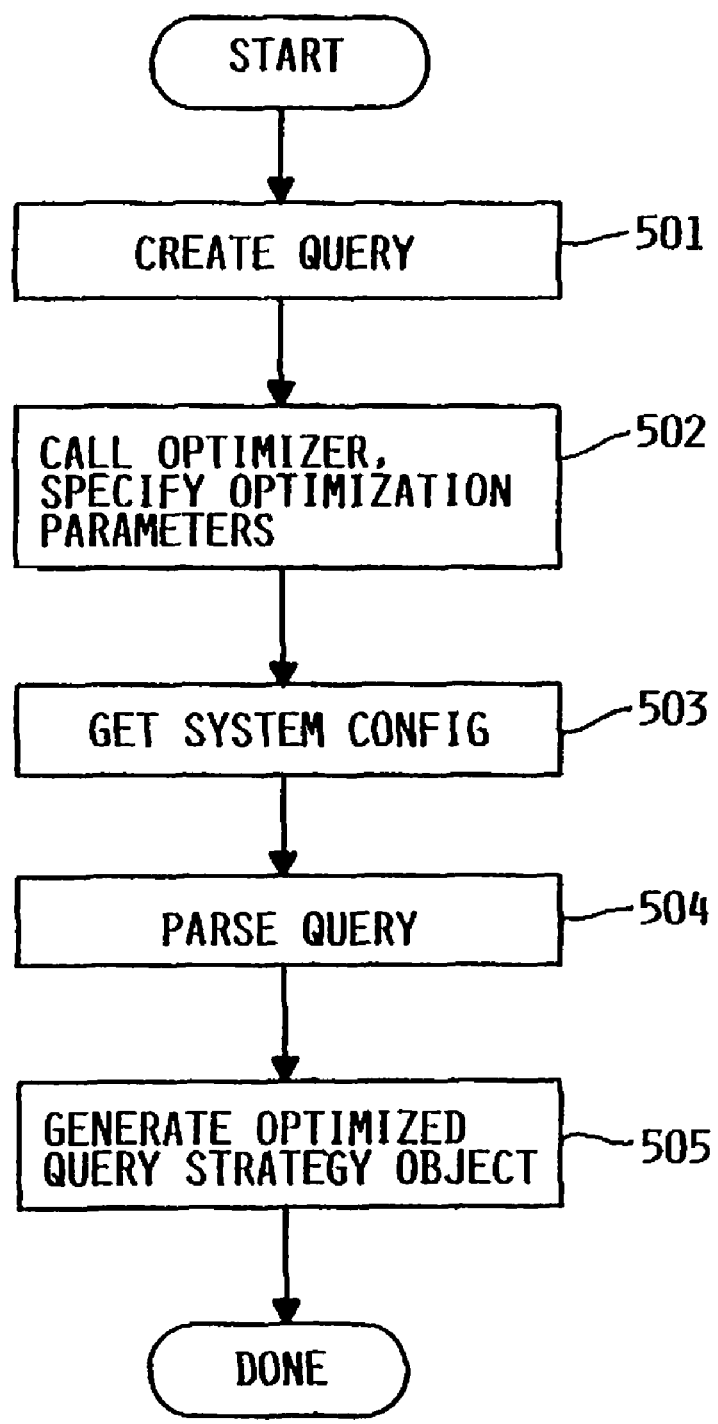
FIG. 5 is a flow diagram illustrating at a high level the process of generating an optimized query strategy object, according to the preferred embodiment.

FIG. 5 is a flow diagram illustrating at a high level the process of generating an optimized query strategy object 411, 412. The user initially creates a source query using any of various tools available (step 501). Preferably, database management system 401 contains an interactive query generation and editing function as is known in the art, which allows the user to interactively specify the logical conditions of the query. However, a query could be generated using a tool external to database management system 401. For example, some database management systems support queries in plain text, which could be generated with any text editor. The query could be created in any of various database query languages, now known or hereafter developed, such as SQL. The source query may be saved to disk storage, and re-edited multiple times, so that there may be a considerable gap in time between step 501 and the remaining steps of FIG. 5.

After generating the source query, the user application passes the source to the database management system 401, which calls the query optimizer 402 to create an optimized query strategy for executing the source query (step 502). Depending on the sophistication of the query optimizer, there may be various user selectable parameters which can be set to regulate the optimization. For example, the user may specify whether the query is to be optimized to rapidly produce partial results (which may mean that a less than optimal process for producing full results is used), or optimized to produce full results (which may mean that partial results are not available as soon as possible).

The query optimizer determines the system configuration to which the query will be optimized (step 503). Various system configuration parameters may be used, some of which may be fixed (such as a type or clock speed of processor), while others are variable depending on a logical partition definition. Specifically, in the preferred embodiment, one of the system configuration parameters is the number of virtual processors, which is a characteristic of a logical partition subject to dynamic alteration. The number of virtual processors in effect specifies the degree of parallelism allowed for query execution, and may therefore affect the strategy chosen for query execution. It would be possible to use other or additional logical configuration parameters in determining an optimum strategy. For example, as one alternative embodiment, the optimizer additionally uses the logical processing capacity of the partition. This information may be significant, e.g., where the user has specified a time limit for query execution.

In the preferred embodiment, the logical partition parameters used by the query optimizer are the parameters associated with the logical partition in which the query optimizer is executing, and at the time the query optimizer generates the optimized query. However, the logical partition parameters for which a query is optimized need not be limited to any particular logical partition. In an alternative embodiment, the user could specify an arbitrary set of logical partition parameters for use in optimizing a query.

The query optimizer parses the source query to generate a logical query representation (step 504). In some environments, the step of parsing may be performed by a separate application before calling the optimizer, and a parsed version of the query may be saved as a file in some intermediate representation. Therefore, step 504 is not necessarily performed after steps 502 or 503.

With the source query parsed and the optimization parameters determined, the optimizer then generates an optimized query strategy according to the specified parameters (step 505). This optimized query strategy is output as a query strategy object 411, 412, which may be saved to disk, and which may be executed multiple times and at spaced-apart intervals. Additionally, it is possible that the query strategy may be later executed in a logical partition other than the partition in which the optimizer was executing when the strategy was generated. Query strategy object 411, 412 contains, in addition to the query execution strategy, the various input parameters which were used to generate the query, and in particular, the logical partition processor configuration parameters.

Figure 6:
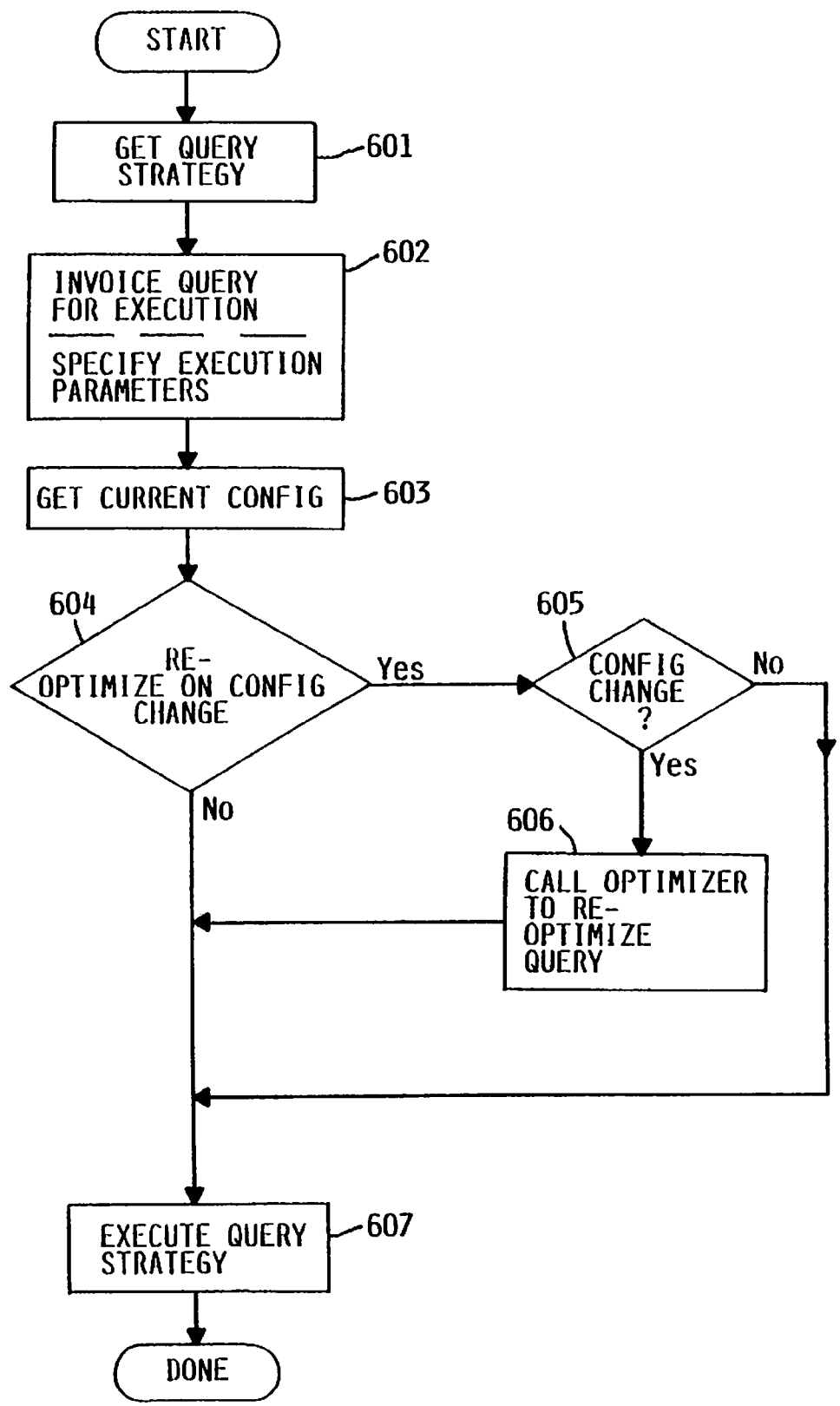
FIG. 6 is a flow diagram illustrating at a high level the process of executing a previously created and optimized query strategy, according to the preferred embodiment.

FIG. 6 is a flow diagram illustrating at a high level the process of executing a previously optimized query strategy. A query is first created and a query strategy generated as described above with respect to FIG. 5. The user invokes the database management system, which loads the query strategy object into memory (step 601). If the strategy object is already in memory (e.g., the strategy is to be executed immediately after optimization as described above), then step 601 is not required. The user invokes the query for execution, specifying any desired execution parameters (step 602). The database management system 401 may support various execution parameters which are invoked when the query is called for execution, and which control the execution of the query.

In the preferred embodiment, the user may specify whether the query is to be re-optimized if there has been a change in logical partition parameters. By default, it is assumed that the query should be re-optimized if the configuration has changed. However, the user may wish to override this default, and may do so as an execution parameter when the query is invoked. E.g., the user may know that the query will be run only once with the current configuration, and may simply wish to avoid spending time in re-optimization. Alternatively, the user may wish to maintain the same query strategy because it has known performance characteristics. In an alternative embodiment, the query is always re-optimized upon a configuration change.

Upon receiving the user command to invoke the query, the database management system 401 retrieves the current configuration of the logical partition in which the query will execute (step 603). The database management system determines whether the query is to be re-optimized on a change in configuration of the logical partition parameters (step 604), i.e., whether the user has overridden the default to re-optimize. If the default has not been overridden, the "Y" branch is taken from step 604. The database management system therefore compares the logical partition configuration assumptions under which the optimizer originally generated the query strategy and which are stored in the query strategy object, with the current configuration of the logical partition in which the query will execute (step 605).

If the configuration has changed, the "Y" branch is taken from step 605. In this case, the optimizer is automatically called to generate a new configuration strategy according to the current logical partition configuration (step 606). I.e., either the original query source file or some parsed representation thereof is retrieved; the optimizer is invoked using the same optimization parameters as were used originally, except that the current logical partition configuration is used in place of the original parameters, and the optimizer generates a new query strategy object. In the preferred embodiment, the optimizer simply re-optimizes the query using the original parameters except for configuration; however, it would alternatively be possible to solicit user interactive input to vary any of the query optimization parameters, even those unrelated to logical partition configuration. The newly generated query strategy may either be a contained in a separate object in addition to the original query strategy object, or may replace the original query strategy object.

The system then executes the query strategy (step 607), which is either the original query strategy if step 606 has not been taken, or the re-optimized query strategy if step 606 has been taken.

A particular set of logical partition parameters has been described in the preferred embodiment, and a particular parameter (i.e., virtual processors) used by the optimizer to generate an appropriate query strategy. However, it will be appreciated that a logically partitioned computer system could use other configuration parameters; that other parameters (including parameters described herein as well as those not described) may affect an optimization strategy for a query; and that a query optimizer could use these other parameters in addition to or in place of the parameters described herein.

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as main memory 102 and as storage devices attached to storage IOPs 111, 112 and 116.

In the preferred embodiment described above, the computer system utilizes an IBM AS/400 or I/Series architecture. It will be understood that certain implementation details above described are specific to this architecture, and that logical partitioning management mechanisms in accordance with the present invention may be implemented on different architectures, and certain implementation details may vary.

While the invention has been described in connection with what is currently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method for database query optimization in a computer system, comprising the steps of:

defining a database query;

constructing a first search strategy for executing said database query in said computer system, said computer system having a plurality of logical partitions thereof, each logical partition having a respective resource assignment, each said resource assignment allocating respective selective one or more resources of said computer system to its corresponding logical partition, wherein each of a plurality of tasks executing in said computer system is assigned to a respective one of said logical partitions and restricted to using only the respective selective one or more resources allocated to the respective logical partition by its respective resource assignment, said first search strategy being dependent on a first resource assignment, said first resource assignment being the resource assignment corresponding to a logical partition with which said first search strategy is associated at the time of constructing said first search strategy for executing said database query in said computer system;

invoking said database query for execution in a first logical partition, said invoking step being performed after said step of constructing a first search strategy;

automatically comparing a second resource assignment to said first resource assignment, said second resource assignment being associated with said first logical partition at the time said invoking said database query for execution step is performed; and automatically constructing a second search strategy dependent on said second resource assignment, said step of automatically constructing a second search strategy being performed dependent on the results of said comparing step.

2. The method for database query optimization of claim 1, wherein said selective one or more resources of said computer system comprises processor resources.

3. The method for database query optimization of claim 2, wherein said respective resource assignment of each partition comprises a respective number of virtual processors of each partition, said respective number being an integer.

4. The method for database query optimization of claim 3, wherein a set of processors is shared by a set of said logical partitions, said set of said logical partitions containing at least two partitions, said respective resource assignment of each partition of said set of partitions including said set of processors.

5. The method for database query optimization of claim 1, wherein the respective resource assignments of each of a plurality of logical partitions may be dynamically altered.

6. The method for database query optimization of claim 1, further comprising the step of:

saving said first search strategy in a persistent object for later execution, said saving step including saving said first resource assignment in said object.

7. A program product for database query optimization in a computer system having a plurality of central processors and a dynamic logical partitioning mechanism, said dynamic logical partitioning mechanism supporting a plurality of defined logical partitions of said computer system, each logical partition having a respective processor resource assignment, wherein each task executing in said computer system is assigned to a respective one of said logical partitions and restricted to using only the processor resources which are allocated to the respective logical partition by its respective processor resource assignment, said program product comprising a plurality of processor executable instructions recorded on tangible computer-readable media, wherein said instructions, when executed by at least one central processor of said computer system, cause the system to perform the steps of:

receiving a definition of a database query;

constructing a first search strategy for said database query, said first search strategy being dependent on a first processor resource assignment;

invoking said database query for execution in a first logical partition, said invoking step being performed after said step of constructing a first search strategy;

comparing a second processor resource assignment to said first processor resource assignment, said second processor resource assignment being associated with said first logical partition at the time said invoking said database query for execution step is performed; and automatically constructing a second search strategy dependent on said second processor resource assignment, said step of automatically constructing a second search strategy being performed dependent on the results of said comparing step;

wherein said first processor resource assignment is the processor resource assignment for a logical partition with which said database query is associated at the time said step of constructing a first search strategy is performed; and wherein said step of constructing a first search strategy for said database query comprises the step of automatically determining said processor resource assignment for said logical partition with which said database query is associated at the time said step of constructing a first search strategy is performed.

8. The program product for database query optimization of claim 7, wherein said respective processor resource assignment of each partition comprises a respective number of virtual processors of each partition, said respective number being an integer.

9. The program product for database query optimization of claim 7, wherein the definition of a plurality of logical partitions may be dynamically altered.

10. The program product for database query optimization of claim 7, wherein said instructions further cause said computer system to perform the step of:

saving said first search strategy in a persistent object for later execution, said saving step including saving said first processor resource assignment in said object.

11. A computer system, comprising:

a plurality of central processing units;

a memory;

a logical partitioning mechanism supporting a plurality of defined logical partitions of said computer system, each logical partition having a respective processor resource assignment, wherein each task executing in said computer system is assigned to a respective one of said logical partitions and restricted to using only the processor resources which are allocated to the respective logical partition by its respective processor resource assignment, and wherein the definition of said logical partitions may be dynamically altered;

a database;

a database management system for managing said database, wherein said database management system:

(a) performs query optimization of a database query for said database to produce a first search strategy, said first search strategy being dependent on a first processor resource assignment, said first processor resource assignment being the processor resource assignment corresponding to a logical partition with which said first search strategy is associated at the time said database management system performs query optimization of said database query for said database to produce said first search strategy;

(b) responsive to invoking said first query search strategy for execution, compares said first processor resource assignment with a second processor resource assignment associated with a logical partition of execution at the time said first search strategy is invoked for execution; and (c) depending on the results of said comparison performed in (b), automatically constructs a second search strategy dependent on said second processor resource assignment.

12. The computer system of claim 11, wherein said respective processor resource assignment of each partition comprises a respective number of virtual processors of each partition, said respective number being an integer.

13. The computer system of claim 12, wherein said logical partitioning mechanism supports the definition of at least one set of processors which is shared by a set of said logical partitions, said set of said logical partitions containing at least two partitions, said respective processor resource assignment of each partition of said set of partitions including said set of processors.

14. The computer system of claim 11, wherein said database management system saves said first search strategy in a persistent object for later execution, said persistent object including said first processor resource assignment.

* * * * *